United States Patent
Song et al.

(10) Patent No.: US 10,631,171 B2
(45) Date of Patent: Apr. 21, 2020

(54) METHOD AND DEVICE FOR SCHEDULING MULTI-FLOW TRANSMISSION

(71) Applicant: Huawei Technologies Co., Ltd., Shenzhen, Guangdong (CN)

(72) Inventors: Weiwei Song, Shenzhen (CN); Bo Lin, Beijing (CN); Xin Xiong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 14/554,460

(22) Filed: Nov. 26, 2014

(65) Prior Publication Data
US 2015/0078323 A1 Mar. 19, 2015

Related U.S. Application Data

(63) Continuation of application No. PCT/CN2012/076284, filed on May 30, 2012.

(51) Int. Cl.
*H04W 16/14* (2009.01)
*H04W 72/04* (2009.01)
(Continued)

(52) U.S. Cl.
CPC ....... *H04W 16/14* (2013.01); *H04L 12/40013* (2013.01); *H04L 12/6418* (2013.01);
(Continued)

(58) Field of Classification Search
CPC ... H04W 48/18; H04W 48/14; H04W 76/021; H04W 76/022
See application file for complete search history.

(56) References Cited

U.S. PATENT DOCUMENTS

2005/0043050 A1  2/2005  Lee et al.
2006/0146833 A1*  7/2006  Roberts ................. H04W 99/00
                                                    370/395.42
(Continued)

FOREIGN PATENT DOCUMENTS

CN    1839653 A    9/2006
CN    1949681 A    4/2007
(Continued)

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.5.0, Mar. 2012, 54 pages.
(Continued)

*Primary Examiner* — Un C Cho
*Assistant Examiner* — Peter K Mak
(74) *Attorney, Agent, or Firm* — Leydig, Voit & Mayer, Ltd.

(57) ABSTRACT

The present application provides a method and a device for scheduling multi-flow transmission. The method includes: receiving a MAC layer configuration parameter corresponding to a media access control MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a second mapping; and executing a MAC layer function according to the MAC layer configuration parameter, and performing MAC layer data transmission. Embodiments of the present application can satisfy a demand of multi-flow transmission.

12 Claims, 4 Drawing Sheets

(51) Int. Cl.
*H04W 28/18* (2009.01)
*H04W 72/12* (2009.01)
*H04L 12/40* (2006.01)
*H04L 12/64* (2006.01)

(52) U.S. Cl.
CPC ....... *H04W 28/18* (2013.01); *H04W 72/0413* (2013.01); *H04W 72/12* (2013.01)

(56) References Cited

U.S. PATENT DOCUMENTS

| | | | |
|---|---|---|---|
| 2007/0073895 A1* | 3/2007 | Sebire | H04L 47/10 709/230 |
| 2008/0165755 A1* | 7/2008 | Marinier | H04W 28/065 370/342 |
| 2008/0225766 A1* | 9/2008 | Roy | H04L 1/1835 370/310 |
| 2009/0016254 A1* | 1/2009 | Lee | H04W 72/005 370/312 |
| 2009/0034466 A1* | 2/2009 | Lindskog | H04L 1/0078 370/329 |
| 2009/0109905 A1 | 4/2009 | Ahmadi | |
| 2009/0207794 A1* | 8/2009 | Meylan | H04W 76/28 370/329 |
| 2010/0182963 A1* | 7/2010 | Fischer | H04W 48/18 370/329 |
| 2010/0202360 A1* | 8/2010 | Terry | H04B 7/2606 370/328 |
| 2011/0134829 A1* | 6/2011 | Chen | H04L 1/1854 370/328 |
| 2012/0208556 A1* | 8/2012 | Jung | H04W 48/16 455/456.1 |

FOREIGN PATENT DOCUMENTS

| | | |
|---|---|---|
| CN | 1992608 A | 7/2007 |
| CN | 101123574 A | 2/2008 |
| CN | 101431457 A | 5/2009 |
| CN | 101715212 A | 5/2010 |
| EP | 1 608 194 A1 | 12/2005 |
| EP | 2 056 644 A2 | 5/2009 |
| WO | WO 2004/042952 A1 | 5/2004 |
| WO | WO 2006/110072 A1 | 10/2006 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0, pp. 1-207, 3rd Generation Partnership Project, Valbonne, France (Sep. 2014).

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.3.0, pp. 1-368, 3rd Generation Partnership Project, Valbonne, France (Sep. 2014).

* cited by examiner

METHOD AND DEVICE FOR SCHEDULING MULTI-FLOW TRANSMISSION

CROSS-REFERENCE TO RELATED APPLICATIONS

This application is a continuation of International Application No. PCT/CN2012/076284, filed on May 30, 2012, which is hereby incorporated by reference in its entirety.

TECHNICAL FIELD

The present application relates to wireless communications technologies, and in particular, to a method and a device for scheduling multi-flow transmission.

BACKGROUND

In a long term evolution (LTE) technology, device to device (D2D) or uplink (Uplink, UL) convergence, a UL cross-radio access technology (RAT) multi-carrier technology, a multi-flow transmission scenario exists. In a multi-flow transmission scenario, a multi-flow control method may be adopted to split different radio bearers (RB) to different cells for data transmission. For example, a control plane bearer and a user plane bearer are transmitted in different cells separately, or different RBs are mapped to different cells.

In the multi-flow transmission scenario, transmission resources of different cells need to be occupied, and therefore, logic channels need to be mapped to different transport channels and/or mapped to different physical entities. However, according to an existing Media Access Control (MAC) layer function, all logic channels can only be mapped to a same transport channel and a same physical entity, and it cannot be implemented that logic channels corresponding to different services are mapped to different transport channels and/or physical entities.

SUMMARY

The present application provides a method and a device for scheduling multi-flow transmission, which are used to map different logic channels to different transport channels and/or physical entities, so as to improve MAC layer transmission efficiency.

One aspect of the present application provides a method for scheduling multi-flow transmission, including:

receiving a MAC layer configuration parameter corresponding to a media access control MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping; and executing a MAC layer function according to the MAC layer configuration parameter, and performing MAC layer data transmission, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity.

Another aspect of the application further provides a method for scheduling multi-flow transmission, including:

determining a MAC layer configuration parameter corresponding to a media access control MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping; and sending the MAC layer configuration parameter to a terminal, so that the terminal executes a MAC layer function according to the MAC layer configuration parameter, and performs MAC layer data transmission, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity.

Another aspect of the present application further provides a device for scheduling multi-flow transmission, including:

a receiving module, configured to receive a MAC layer configuration parameter corresponding to a media access control MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity; and a processing module, configured to execute a MAC layer function according to the MAC layer configuration parameter received by the receiving module, and perform MAC layer data transmission.

Another aspect of the application further provides a device for scheduling multi-flow transmission, including:

a determining module, configured to determine a MAC layer configuration parameter corresponding to a media access control MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity; and a sending module, configured to send the MAC layer configuration parameter determined by the determining module to a terminal, so that the terminal executes a MAC layer function according to the MAC layer configuration parameter, and performs MAC layer data transmission.

It can be known from the foregoing technical solutions that a difference from the prior art in which all logic channels can only be mapped to a same transport channel and a same physical entity lies in that in the present embodiment of the application, by configuring at least two sets of mappings, multiple sets of mappings exist, so that different logic channels/RBs can be mapped to different transport channels/MAC entities and/or cells/physical entities, so as to satisfy a demand of a multi-flow transmission scenario, thereby improving MAC layer transmission efficiency.

BRIEF DESCRIPTION OF THE DRAWINGS

To describe the technical solutions in the embodiments of the present application more clearly, the following briefly introduces the accompanying drawings used in describing the embodiments. Apparently, the accompanying drawings in the following description show some embodiments of the present application, and persons of ordinary skill in the art may still derive other drawings from these accompanying drawings without creative efforts.

DETAILED DESCRIPTION

To make the objectives, technical solutions, and advantages of the embodiments of the present application more comprehensible, the following clearly describes the technical solutions in the embodiments of the present application with reference to the accompanying drawings. Apparently, the described embodiments are merely a part of the embodiments of the present application rather than all of the embodiments. All other embodiments obtained by persons of ordinary skill in the art based on the embodiments of the present application without creative efforts shall fall within the protection scope of the present application.

In a multi-flow transmission scenario, an LTE technology is used as an example, and in this case, a network system includes a macro base station, an access node, and a user device (UE). When a manner that a control plane bearer and a user plane bearer are transmitted in different cells is adopted, at an air interface, user plane data is transmitted through a link between the access node and the UE, and control plane data is transmitted through a link between the macro base station and the UE; and when a manner that different RBs are mapped to different cells is adopted, a link among the macro base station, the access node, and the UE is responsible for transmission of data on a part of the RBs, a link between the macro base station and the UE is responsible for transmission of data on the other part of the RBs, where the RBs may be signaling radio bearers (SRB) bearing control plane data or data radio bearers (DRB) bearing user plane data. In addition, in a D2D scenario, a D2D terminal (D2D UE) is equivalent to the access node in the LTE, and in a UL convergence technology or UL cross-RAT multi-carrier technology scenario, a radio network controller (RNC) or a nodeB is equivalent to the access node in the LTE technology.

Figure 1:
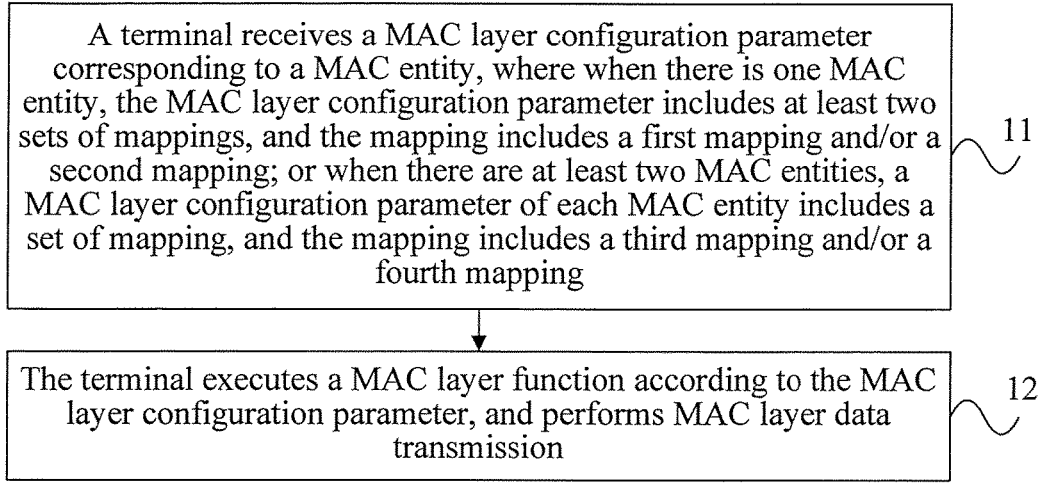
FIG. 1 is a flow diagram of a method for scheduling multi-flow transmission according to an embodiment of the present application.

A media access control (MAC) layer is located in a layer 2 (L2) protocol stack, the MAC layer is mainly responsible for scheduling of data transmission, and a MAC layer function is executed by a MAC entity. In the prior art, each device, for example, a UE has only one MAC layer entity corresponding to one set of MAC layer configuration parameter. When a MAC layer function is executed, all logic channels are mapped to a same transport channel, where the logic channels include a dedicated control channel (DCCH), a dedicated traffic channel (DTCH), and a common control channel (CCCH), and the transport channel includes a downlink shared channel (DL-SCH) and an uplink shared channel (UL-SCH); and then are mapped to a same physical entity (Physical entity). FIG. 1 is a flow diagram of a method for scheduling multi-flow transmission according to an embodiment of the present application, which includes:

Step 11: A terminal receives a MAC layer configuration parameter corresponding to a MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping, where the first mapping is a mapping between a logic channel/RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity.

Specifically, the first mapping includes:

a mapping between a logic channel identity and a transport channel identity; or a mapping between an RB identity and a transport channel identity;

the second mapping includes:

a mapping between a transport channel identity and a physical entity identity; or a mapping between a transport channel identity and a cell identity.

the third mapping includes:

a mapping between a logic channel identity and a transport channel identity; or a mapping between an RB identity and a transport channel identity; or a mapping between an RB identity and each MAC entity identity; or a mapping between a logic channel identity and each MAC entity identity; and the fourth mapping includes:

a mapping between a transport channel identity and a cell identity; or a mapping between each MAC entity identity and a cell identity; or a mapping between a transport channel identity and a physical entity identity; or a mapping between each MAC entity identity and a physical entity identity.

Step 12: The terminal executes a MAC layer function according to the MAC layer configuration parameter, and performs MAC layer data transmission.

In the embodiment of the present application, the terminal is, for example, a UE, and in another system, the terminal may also have another name, for example, a mobile station (MS).

In addition, in the embodiment of the present application, that a base station sends a MAC layer configuration parameter is used as an example, and the base station may refer to an LTE base station (eNodeB), and in addition, it may also that another device sends the MAC layer configuration parameter, for example, another LTE type access node, a D2D terminal, an RNC, or a NodeB. The another LTE type access node may be, for example, a small base station (Pico), an indoor base station (Femto), a low mobility base station (LoMo), a local radio access point (AP), a low power node (LPN), or a radio remote unit (RRU).

Figure 2:
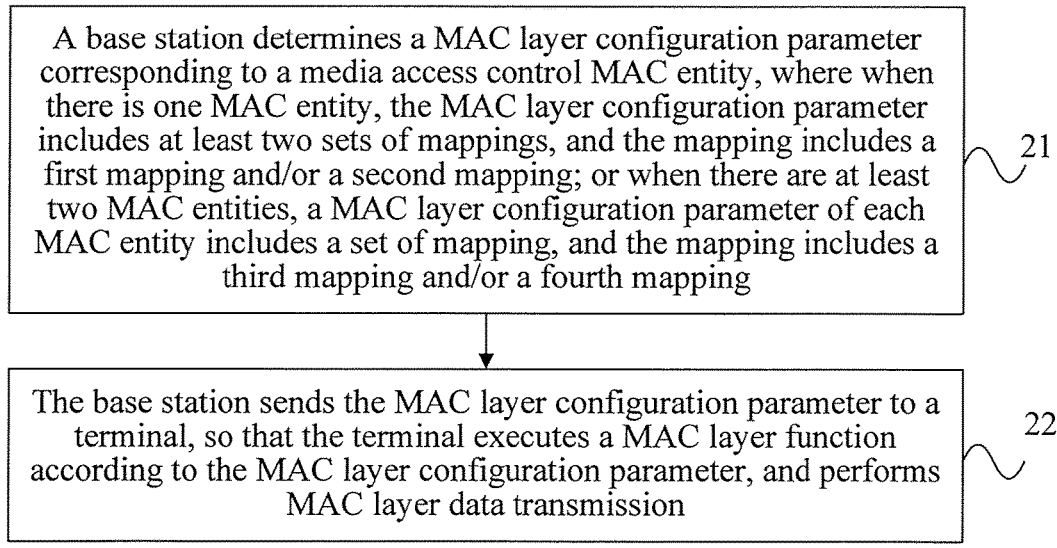
FIG. 2 is a flow diagram of a method for scheduling multi-flow transmission according to another embodiment of the present application.

Correspondingly, a base station side may execute a procedure as shown in FIG. 2, referring to FIG. 2, which includes:

Step 21: A base station determines a MAC layer configuration parameter corresponding to a MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity;

Step 22: The base station sends the MAC layer configuration parameter to a terminal, so that the terminal executes a MAC layer function according to the MAC layer configuration parameter, and performs MAC layer data transmission.

In this embodiment, the base station (for example, eNodeB or NodeB) is used as an example, and an execution body may also be an LTE access node, a D2D terminal, an RNC, or the like.

The terminal may be an UE, an MS, or the like.

In the embodiment of the present application, in order to implement that different logic channels/RBs are mapped to different transport channels/MAC entities and/or cells/physical entities, the foregoing at least two sets of mappings need to be configured, each set of mapping can complete mapping once, and therefore, through multiple sets of mappings, the different logic channels/RBs can be mapped to the different transport channels/MAC entities and/or cells/physical entities. In this way, a demand of mapping different logic channels/RBs to different transport channels/MAC entities and/or cells/physical entities during multi-flow transmission can be satisfied.

In order to implement at least two sets of mappings, the following manner may be adopted:

Manner 1: At least two MAC entities are configured, each MAC entity corresponds to a set of MAC layer configuration parameter, and each set of MAC layer configuration parameter includes a set of mapping; or, Manner 2: one MAC entity is configured, the MAC entity corresponds to at least two sets of mappings, and in this case, the MAC layer configuration parameter corresponds to one MAC entity, but the MAC entity corresponds to multiple sets of mappings.

Optionally, when there is one MAC entity, the at least two sets of mappings are embodied in the form of a mapping list, and the mapping list includes at least two sets of mapping identities.

In this case, the executing a MAC layer function according to the MAC layer configuration parameter includes:

executing the first mapping and the second mapping between channels at least twice according to the MAC layer configuration parameter; or executing the first mapping between channels at least twice according to the MAC layer configuration parameter; or executing the second mapping between channels at least twice according to the MAC layer configuration parameter; or performing independent uplink scheduling according to the MAC layer configuration parameter.

Correspondingly, the first mapping between the channels includes:

when the first mapping is specifically a mapping between a logic channel identity and a transport channel identity, mapping an uplink logic channel to an uplink transport channel according to the mapping between the logic channel identity and the transport channel identity; or when the first mapping is specifically a mapping between an RB identity and a transport channel identity, mapping an uplink logic channel to an uplink transport channel according to the mapping between the RB identity and the transport channel identity and correspondence between the RB identity and a logic channel identity; or when the first mapping is specifically a mapping between a logic channel identity and a transport channel identity, mapping a downlink logic channel to a downlink transport channel according to the mapping between the logic channel identity and the transport channel identity; or when the first mapping is specifically a mapping between an RB identity and a transport channel identity, mapping a downlink logic channel to a downlink transport channel according to the mapping between the RB identity and the transport channel identity and correspondence between the RB identity and a logic channel identity; and the second mapping between the channels includes:

when the second mapping is specifically a mapping between a transport channel identity and a physical entity identity, mapping, according to the mapping between the transport channel identity and the physical entity identity, an uplink transport channel to an uplink physical channel corresponding to a physical entity; or when the second mapping is specifically a mapping between a transport channel identity and a cell identity, mapping, according to the mapping between the transport channel identity and the cell identity, an uplink transport channel to an uplink physical channel corresponding to a cell; or when the second mapping is specifically a mapping between a transport channel identity and a physical entity identity, mapping, according to the mapping between the transport channel identity and the physical entity identity, a downlink transport channel to a downlink physical channel corresponding to a physical entity; or when the second mapping is specifically a mapping between a transport channel identity and a cell identity, mapping, according to the mapping between the transport channel identity and the cell identity, a downlink transport channel to a downlink physical channel corresponding to a cell.

Optionally, when there are at least two MAC entities, the executing a MAC layer function according to the MAC layer configuration parameter includes:

executing the third mapping and/or the fourth mapping between channels according to the MAC layer configuration parameter, and performing independent uplink scheduling.

Correspondingly, the third mapping between the channels includes:

when the third mapping is specifically a mapping between a logic channel identity and a transport channel identity, mapping an uplink logic channel to an uplink transport channel according to the mapping between the logic channel identity and the transport channel identity; or when the third mapping is specifically a mapping between an RB identity and a transport channel identity, mapping an uplink logic channel to an uplink transport channel according to the mapping between the RB identity and the transport channel identity and correspondence between the RB identity and a logic channel identity; or when the third mapping is specifically a mapping between a logic channel identity and a MAC entity identity, mapping, according to the mapping between the logic channel identity and the MAC entity identity, an uplink logic channel to an uplink transport channel corresponding to a MAC entity; or when the third mapping is specifically a mapping between an RB identity and a MAC entity identity, mapping, according to the mapping between the RB identity and the MAC entity identity and correspondence between the RB identity and a logic channel identity, an uplink logic channel to an uplink transport channel corresponding to a MAC entity; or when the third mapping is specifically a mapping between a logic channel identity and a transport channel identity, mapping a downlink logic channel to a downlink transport channel according to the mapping between the logic channel identity and the transport channel identity; or when the third mapping is specifically a mapping between an RB identity and a transport channel identity, mapping a downlink logic channel to a downlink transport channel according to the mapping between the RB identity and the transport channel identity and correspondence between the RB identity and a logic channel identity; or when the third mapping is specifically a mapping between a logic channel identity and a MAC entity identity, mapping, according to the mapping between the logic channel identity and the MAC entity identity, a downlink logic channel to a downlink transport channel corresponding to a MAC entity; or when the third mapping is specifically a mapping between an RB identity and a MAC entity identity, mapping, according to the mapping between the RB identity and the MAC entity identity and correspondence between the RB identity and a logic channel identity, a downlink logic channel to a downlink transport channel corresponding to a MAC entity; and the fourth mapping between the channels includes:

when the fourth mapping is specifically a mapping between a transport channel identity and a physical entity identity, mapping, according to the mapping between the transport channel identity and the physical entity identity, an uplink transport channel to an uplink physical channel corresponding to a physical entity; or when the fourth mapping is specifically a mapping between a transport channel identity and a cell identity, mapping, according to the mapping between the transport channel identity and the cell identity, an uplink transport channel to an uplink physical channel corresponding to a cell; or when the fourth mapping is specifically a mapping between a MAC entity identity and a physical entity identity, mapping, according to the mapping between the MAC entity identity and the physical entity identity, an uplink transport channel corresponding to a MAC entity to an uplink physical channel corresponding to a physical entity; or when the fourth mapping is specifically a mapping between a MAC entity identity and a cell identity, mapping, according to the mapping between the MAC entity identity and the cell identity, an uplink transport channel corresponding to a MAC entity to an uplink physical channel corresponding to a cell; or when the fourth mapping is specifically a mapping between a transport channel identity and a physical entity identity, mapping, according to the mapping between the transport channel identity and the physical entity identity, a downlink transport channel to a downlink physical channel corresponding to a physical entity; or when the fourth mapping is specifically a mapping between a transport channel identity and a cell identity, mapping, according to the mapping between the transport channel identity and the cell identity, an uplink transport channel to an uplink physical channel corresponding to a cell; or when the fourth mapping is specifically a mapping between a MAC entity identity and a physical entity identity, mapping, according to the mapping between the MAC entity identity and the physical entity identity, a downlink transport channel corresponding to a MAC entity to a downlink physical channel corresponding to a physical entity; or when the fourth mapping is specifically a mapping between a MAC entity identity and a cell identity, mapping, according to the mapping between the MAC entity identity and the cell identity, a downlink transport channel corresponding to a MAC entity to a downlink physical channel corresponding to a cell.

In addition, the correspondence between the RB identity and the logic channel identity in the foregoing procedure may be determined when a radio bearer is configured. When a radio bearer is configured, the base station sends correspondence between an RB identity and a logic channel identity to a UE.

Optionally, the performing independent uplink scheduling according to the MAC layer configuration parameter includes:

when there is one MAC entity and when new data transmission is performed, scheduling, according to the first mapping and the second mapping, uplink data of a logic channel that is mapped to a physical entity/cell corresponding to an uplink grant resource; or when there are at least two MAC entities and when new data transmission is performed, scheduling, according to the third mapping and the fourth mapping, uplink data of a logic channel that is mapped to a physical entity/cell corresponding to an uplink grant resource.

A specific scheduling method may include:

First, according to logic channel priorities and a sequence from high to low of the logic channel priorities, a resource is allocated to a logic channel which is mapped to the physical entity/cell corresponding to the uplink grant resource and on which a data amount that is greater than zero is allowed to be transmitted.

A resource allocating method is that: The UE allocates a resource to data of a logic channel with a highest priority for uplink transmission. Only when an allowed transmitted data amount of the logic channel with the highest priority is smaller than or equal to zero, the UE allocates a remaining resource to a logic channel with a low priority for data transmission.

Then, the UE subtracts a data amount that has been transmitted from the allowed transmitted data amount of the logic channel.

Next, when allowed transmitted data amounts of all logic channels that are mapped to the physical entity/cell corresponding to the uplink grant resource is smaller than or equal to zero, and there is still a remaining uplink transmission resource, the UE allocates, according to the sequence from high to low of the logic channel priorities, an uplink resource to the logic channels that are mapped to the physical entity/cell corresponding to the uplink grant resource. The UE allocates a resource to the data of the logic channel with the highest priority for uplink transmission. Only when all logic channels with high priorities are transmitted completely, the UE allocates a remaining resource to the logic channel with the low priority for data transmission. When the UE completes data transmission of all the logic channels, or uses up the uplink transmission resource, the UE ends uplink scheduling.

Optionally, the MAC layer configuration parameter further includes a MAC layer-related parameter corresponding to each set of mapping, and the MAC layer-related parameter includes at least one of the following items: a discontinuous reception (DRX) configuration parameter, a semi-persistent schedule (SPS) configuration parameter, and hybrid automatic repeat request (HARQ) retransmission times.

Optionally, the method may further include:

When there is one MAC entity, independently executing at least one MAC function of the following items: DRX, SPS, and HARQ according to the MAC layer-related parameter corresponding to each set of mapping and using each set of mapping as a unit.

When there are at least two MAC entities, independently executing at least one MAC function of the following items: DRX, SPS, and HARQ according to the MAC layer-related parameter corresponding to each MAC entity and using each MAC entity as a unit.

Optionally, the MAC layer configuration parameter may be carried in addition, deletion, or reconfiguration dedicated signaling, after receiving the dedicated signaling, corresponding to Manner 1, the UE adds, deletes, or re-configures a MAC entity, and then performs different mapping by adopting a different MAC entity, and corresponding to Manner 2, the UE adds, deletes, or re-configures a mapping, and then performs different mapping by adopting a different mapping.

In addition, optionally, the base station may also execute a corresponding MAC function at the base station side according to the MAC layer configuration parameter. The MAC layer function executed by the base station corresponds to the MAC layer function executed by the UE, for example, during uplink data transmission, the UE maps an uplink logic channel to an uplink transport channel, maps the uplink transport channel to an uplink physical layer channel, and completes scheduling of uplink data, and the base station maps an uplink physical layer channel to an uplink transport channel, maps the uplink transport channel to an uplink logic channel, and completes scheduling of downlink data.

Optionally, the MAC layer configuration parameter configured by the base station may correspond to different MAC entities, or correspond to only one MAC entity but correspond to multiple sets of mappings, and for specific content, reference may be made to the foregoing description of the UE side.

In this embodiment, by configuring at least two sets of mappings, different logic channels/RBs can be mapped to different transport channels/MAC entities and/or cells/physical entities according to different sets of mappings, so as to satisfy a demand of a multi-flow transmission scenario, thereby improving MAC layer transmission efficiency.

In the following, that in an LTE scenario, an access node is an LPN is used as an example to describe a method in the embodiment of the present application.

Figure 3:
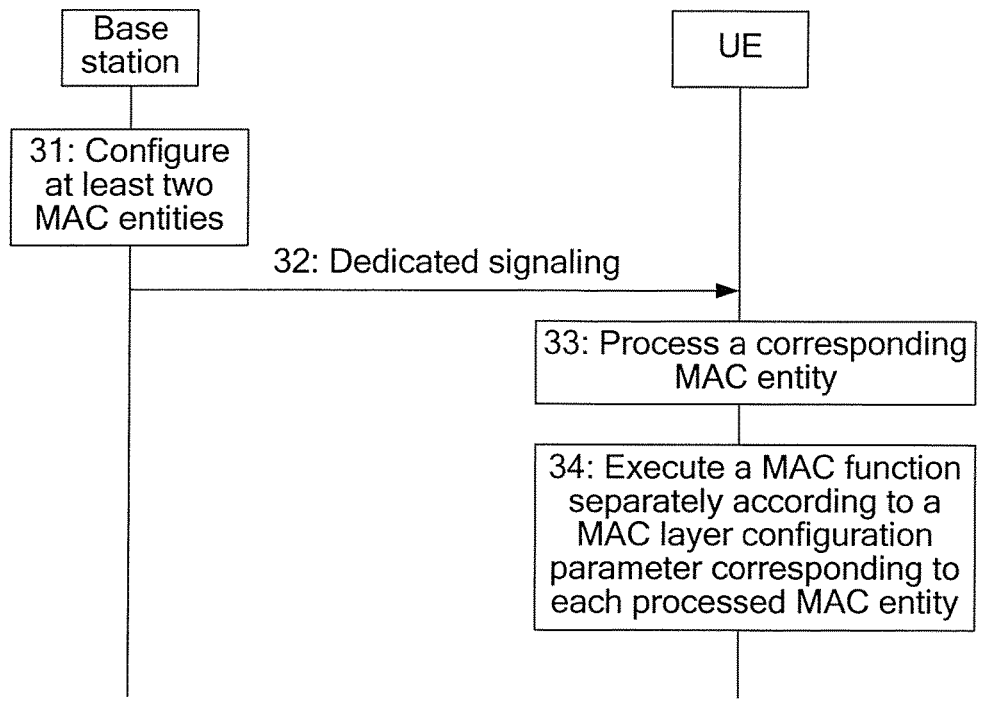
FIG. 3 is a flow diagram of a method for scheduling multi-flow transmission according to another embodiment of the present application.

FIG. 3 is a flow diagram of a method for scheduling multi-flow transmission according to another embodiment of the present application, where in this embodiment, that multiple MAC entities are configured is used as an example, and referring to FIG. 3, the method includes:

Step 31: A base station configures, according to a flow splitting policy, at least two MAC entities and a MAC layer configuration parameter that corresponds to each MAC entity for a UE.

Figure 4:
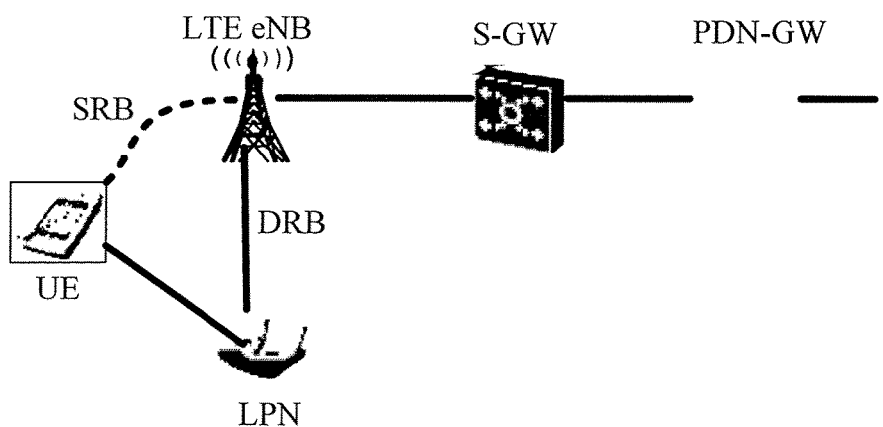
FIG. 4 is a flow diagram of multi-flow transmission in the present application.

The flow splitting policy may be that user plane data and control plane data are separately transmitted, and in this case, referring to FIG. 4, SRB data is transmitted in a macro cell (LTE eNB), and DRB data is transmitted in an LPN cell.

Figure 5:
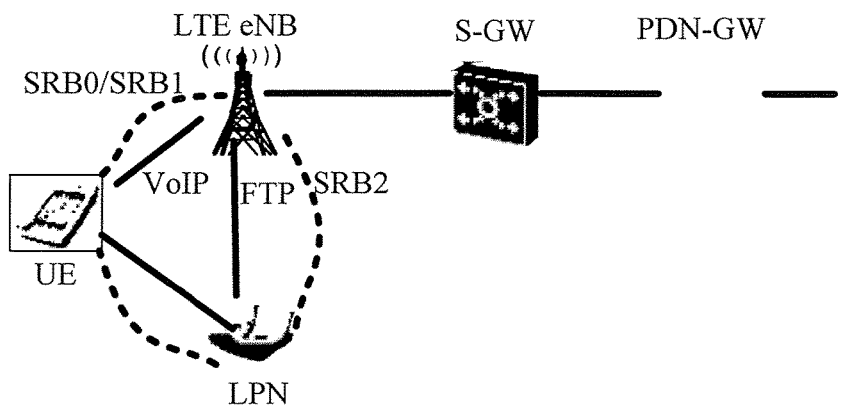
FIG. 5 is another flow diagram of multi-flow transmission in the present application.

Alternatively, the flow splitting policy may be that RB data with a small data amount and/or a high quality of service (QoS) demand is transmitted in a macro cell, and RB data with a great data amount and/or a low QoS demand is transmitted in an LPN cell, for example, referring to FIG. 5, SRB0 data, SRB1 data, and VoIP data are transmitted in the macro cell, and file transfer protocol (FTP) data is transmitted in the LPN cell.

The number of configured MAC entities may be the same as the number of split data flows, for example, when split flows as shown in FIG. 4 or FIG. 5 are transmitted in the macro cell and the LPN cell, two MAC entities may be configured, which are respectively configured to be mapped to the macro cell and the LPN cell.

Specifically, the MAC layer configuration parameter corresponding to each MAC entity may be determined according to a specific flow splitting policy, for example, when an SRB0 and an SRB1 are transmitted in the macro cell and an SRB2 is transmitted in the LPN cell, if logic channels corresponding to the SRB0, the SRB1, and the SRB2 are respectively a CCCH, and DCCHs with logic channel identities being 1 and 2, which are represented as a DCCH1 and a DCCH2 in the following, the CCCH and the DCCH1 are mapped to a transport channel of the macro cell, and the DCCH2 is mapped to a transport channel of the LPN cell, in uplink, the transport channel is an uplink shared channel (UL-SCH), and in downlink, the transport channel is a downlink shared channel (DL-SCH).

In this embodiment, multiple MAC entities are configured and each MAC entity corresponds to one set of MAC layer configuration parameter. Each set of MAC layer configuration parameter may include at least one of the following items:

(1) MAC entity identity, used to identify a MAC entity of a UE and facilitate addition/deletion/re-configuration of the MAC entity. The identity may be an integer (INTEGER) type. For example, MAC-Entity-identity INTEGER(0 . . . X), (2) Mapping between a MAC entity/transport channel and a cell/physical (PHY) entity. The mapping indicates that a MAC entity transport channel is mapped to a physical layer channel of the cell/PHY entity, and is used to represent a mapping between the transport channel and the physical layer channel. For example:

The MAC entity is used as an example, and a mapping with the cell or the physical entity may be respectively represented as follows:

| MAC-Entity-mapping-with-cell<br>or MAC-Entity-mapping-with-PHY-entity | Cell-identity<br>PHY-entity-identity |
|---|---|

"MAC-Entity-mapping-with-cell Cell-identity" is used as an example, usually an information unit is formed by a name and a type, where "MAC-Entity-mapping-with-cell" in the front represents a name, and "Cell-identity" in the rear represents a type, that is, a identity of a specific cell to which the MAC entity (may be represented by using the MAC entity identity in the front) is mapped. For a subsequent similar expressed specific meaning, reference may be made to the description herein.

Cell-identity may be any kind of cell identity, for example, a physical cell identity (PCI), a unique cell identity in a public land mobile network (PLMN) range, an evolved-UMTS terrestrial radio access (EUTRA) cell global identifier (ECGI), a PCI and carrier frequency point information, or a cell index number. The cell index number may be a currently configured cell index (cellindex). The index information may index all configured cells. A PHY entity identity (PHY-entity-identity) is an identity uniquely identifying the PHY entity, and the identity may be an INTEGER type.

(3) Mapping between a MAC entity/transport channel and a logic channel/RB. The mapping indicates that the logic channel/RB is mapped to the MAC entity, and is used to represent a mapping between the transport channel and the logic channel. For example:

| Logical-and-transport-mappingList ::= SEQUENCE SIZE<br>(1..maxLogicalChannelNum)) OF Logical-and-transport-mapping<br>Logical-and-transport-mapping ::= SEQUENCE {<br>logicalChannelIdentity logicalChannelIdentity<br>} |
|---|

The foregoing content is also a specific expressing manner used to describe the mapping between the logic channel and the transport channel, for example, the number of logic channels mapped to the MAC entity indicated by the foregoing MAC entity identity is maxLogicalChannelNum, each logic channel may be specifically represented as "logicalChannelIdentity logicalChannelIdentity", where "logicalChannelIdentity" in the front represents a name, that is, content to be described; and "logicalChannelIdentity" in the rear represents a type, that is, a specific logic channel identity. For a subsequent similar expressed specific meaning, reference may be made to the description herein.

An RB identity (srb-Identity/drb-identity) may also be used to replace the logic channel identity to represent the mapping.

| Logical-and-RB-mappingList ::= SEQUENCE SIZE<br>(1..maxRBNum)) OF Logical-and-RB-mapping<br>Logical-and-RB-mapping ::= SEQUENCE {<br>RB-identity RB-identity<br>} |
|---|

(4) MAC-related Parameter

The MAC parameter may include all or a part of MAC layer configuration parameters, for example, a DRX mechanism parameter, an HARQ maximum retransmission times (maxHARQ-Tx), and an SPS configuration parameter.

Step 32: The base station sends a dedicated signaling to the UE, where the dedicated signaling includes a manner for processing a MAC entity and a MAC layer configuration parameter corresponding to the MAC entity.

The processing manner may be to add, delete, or re-configure one or multiple MAC entities, and a MAC layer configuration parameter corresponding to the added, deleted, or modified MAC entity is the MAC layer configuration parameter included in the dedicated signaling.

Particularly, a dedicated signaling used to delete a MAC layer configuration parameter may include only deleting a MAC entity identity (MAC-Entity-identity).

Step 33: The UE processes a corresponding MAC entity according to the dedicated signaling.

According to an indication of the dedicated signaling, the MAC entity may be added, deleted, or re-configured, which may be completed according to the MAC layer configuration parameter corresponding to each MAC entity during specific configuration.

Step 34: The UE executes a MAC function separately according to a MAC layer configuration parameter corresponding to each processed MAC entity.

After multiple MAC entities are configured, these MAC entities independently execute a MAC layer function, and a MAC function executed by each MAC entity may include at least one of the following items:

(1) Uplink Transport Channel Mapping

Figure 6:
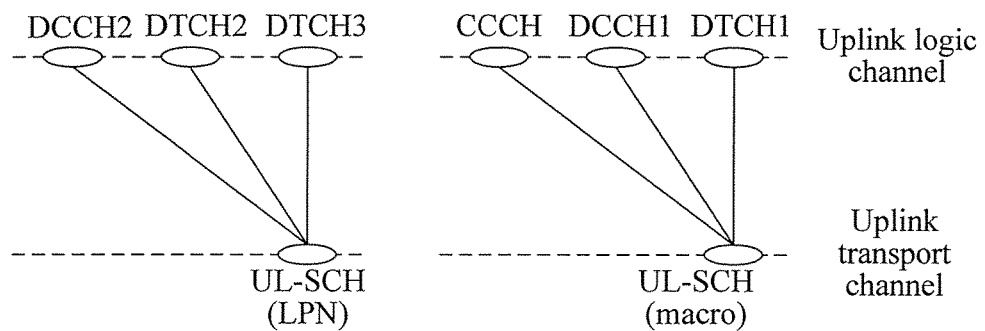
FIG. 6 is a flow diagram of mapping of an uplink transport channel in the present application.

Referring to FIG. 6, the MAC entity maps an uplink logic channel to a corresponding uplink transport channel according to a mapping (Logical-and-transport-mappingList/Logical-and-RB-mappingList) between a MAC entity/transport channel and a logic channel/RB in the corresponding MAC layer configuration parameter.

(2) Downlink Transport Channel Mapping

Figure 7:
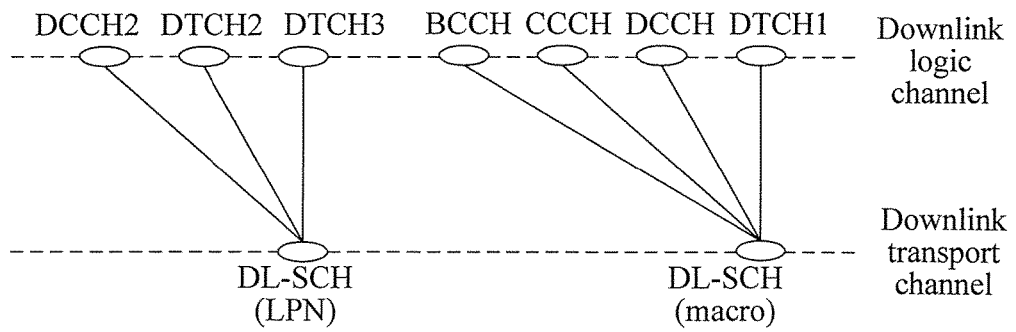
FIG. 7 is a flow diagram of mapping of a downlink transport channel in the present application.

Referring to FIG. 7, the MAC entity maps a downlink logic channel to a corresponding downlink transport channel according to a mapping (Logical-and-transport-mapping-List/Logical-and-RB-mappingList) between a MAC entity/transport channel and a logic channel/RB in the corresponding MAC layer configuration parameter.

(3) Uplink Physical Layer Channel Mapping

The MAC entity maps an uplink transport channel to an uplink physical layer channel according to a mapping between a MAC entity/transport channel and a cell/PHY entity in the corresponding MAC layer configuration parameter. Particularly, one MAC entity may be mapped to one or multiple cells/physical entities. For example, a MAC entity 1 (that is, the MAC-Entity-identity is 1) is mapped to cells with a cell index 1 and a cell index 2. In this case, a UL-SCH corresponding to the MAC entity 1 may be mapped to a physical uplink control channel (PUCCH) and a physical uplink shared channel (PUSCH) of the cell whose index is 1. A DL-SCH corresponding to the MAC entity 1 may be mapped to a physical downlink control channel (PDCCH) and a physical downlink shared channel (PDSCH) of the cell whose index is 1.

(4) Downlink Physical Layer Channel Mapping

The MAC entity maps a downlink transport channel to a downlink physical layer channel according to a mapping between a MAC entity/transport channel and a cell/PHY entity in the corresponding MAC layer configuration parameter. Particularly, one MAC entity may be mapped to one or multiple cells/physical entities. For example, a MAC entity 1 (that is, the MAC-Entity-identity is 1) is mapped to cells with a cell index 1 and a cell index 2. In this case, a DL-SCH corresponding to the MAC entity 1 may be mapped to a PDCCH and a PDSCH of the cell whose index is 1.

(5) Uplink Scheduling Based on a Logic Channel Priority

In the prior art, all logic channels are mapped to a same MAC entity, and therefore, during scheduling, priority sequencing and scheduling are performed on all the logic channels. However, in this embodiment, logic channels are mapped to different MAC entities, and therefore, for each MAC entity, priority sequencing and scheduling are performed only on a logic channel mapped to the MAC entity itself. An independent execution relationship exists between MAC entities. That is to say, when receiving an uplink grant (UL Grant) for new data transmission, the UE performs uplink scheduling according to a priority of a logic channel mapped to a MAC entity corresponding to an uplink grant sending cell/physical entity and according to a token bucket algorithm.

Specifically, for each MAC entity, when executing new data transmission, the UE allocates, according to a priority of a logic channel mapped to the MAC entity, an uplink transmission resource by adopting a token bucket algorithm. The token bucket algorithm is a typical mathematical algorithm. Specific content of the token bucket algorithm includes: The UE schedules, according to a sequence from high to low of logic channel priorities, data of a logic channel which is mapped to the MAC entity and on which a currently allowed transmitted data amount (Bj)>0; and when Bj of all logic channels mapped to the MAC entity <=0, but there is still a remaining uplink resource, the UE schedules, according to the sequence from high to low of the logic channel priorities, the data of the logic channel that is mapped to the MAC entity.

In this embodiment, by configuring multiple MAC entities for a UE, each MAC entity corresponds to one set of mapping, so that multiple sets of mappings can be configured, and different logic channels can be mapped to different transport channels and/or physical layer channels according to the multiple sets of mappings, so as to satisfy a demand of a multi-flow transmission scenario, thereby improving MAC layer transmission efficiency.

Figure 8:
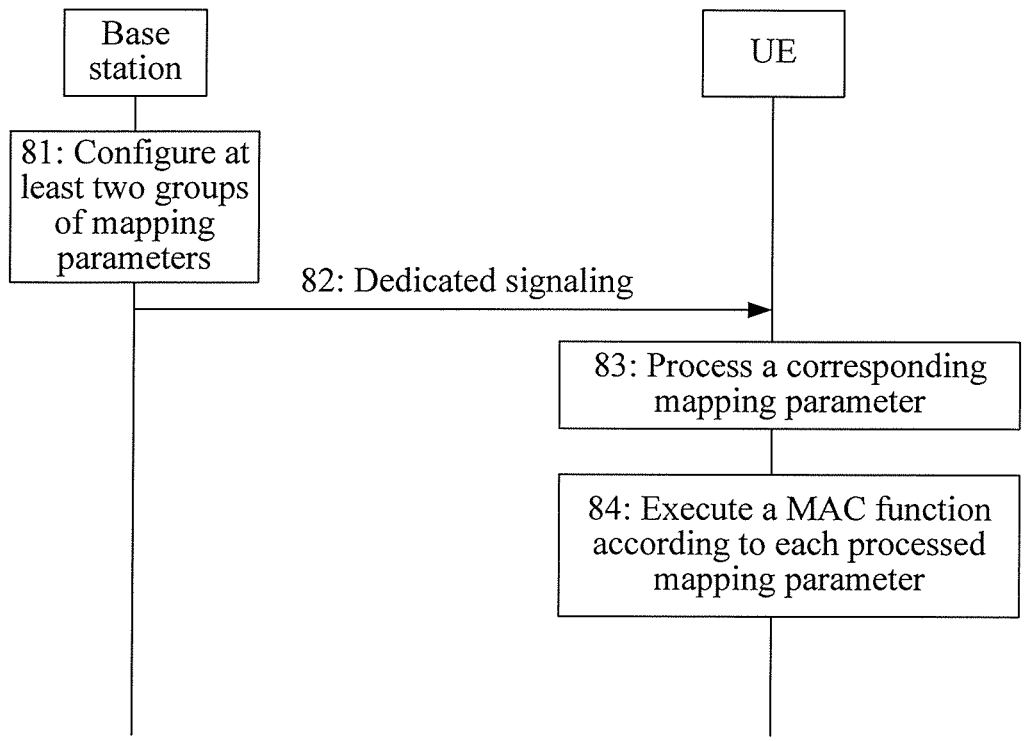
FIG. 8 is a flow diagram of a method for scheduling multi-flow transmission according to another embodiment of the present application.

FIG. 8 is a schematic flowchart of a method for scheduling multi-flow transmission according to another embodiment of the present application, where in this embodiment, that one MAC entity is configured but multiple sets of mappings are configured is used as an example, and referring to FIG. 8, the method includes:

Step 81: A base station configures, according to a flow splitting policy, one MAC entity and a MAC layer configuration parameter that corresponds to the MAC entity for a UE, where the MAC layer configuration parameter includes a mapping list, the mapping list includes at least two sets of mapping parameters, and each set of mapping parameter includes at least a set of mapping.

Being similar to the foregoing embodiment, according to the flow splitting policy, it is assumed that data to be transmitted may be classified into first data and second data, the first data is transmitted in a first cell, and the second data is transmitted in a second cell, and the configured mapping may include: A logic channel corresponding to the first data is mapped to a transport channel and/or physical layer channel corresponding to the first cell, and a logic channel corresponding to the second data is mapped to a transport channel and/or physical layer channel corresponding to the second cell.

Each set of mapping parameter may include at least one of the following items:

(1) Mapping identity (Channel-Mapping-identity), used to identify a mapping and facilitate addition/deletion/reconfiguration of the mapping. The identity may be an INTEGER type. For example, Channel-Mapping-identity INTEGER(0 . . . X), (2) Transport channel identity (Transport-Channel-identity), used to identify a transport channel. The identity may be an INTEGER type. For example, Transport-Channel-identity INTEGER(0 . . . X), (3) Mapping between a transport channel and a cell/PHY entity. The mapping indicates that a MAC transport channel is mapped to a physical layer channel of the cell/PHY entity. For example:

Transport-channel-mapping-with-cell Cell-identity or

Transport-channel-mapping-with-PHY-entity PHY-entity-identity

Cell-identity may be any kind of cell identity, for example, a PCI, a unique cell identity in a PLMN range, an ECGI, a physical cell identity and carrier frequency point information, or a cell index number. The cell index number may be a currently configured cell index (cellindex). The index information may index all configured cells. A PHY entity identity (PHY-entity-identity) is an identity uniquely identifying the PHY entity, and the identity may be an INTEGER type.

(4) Mapping between a transport channel and a logic channel/RB.

The mapping indicates that the logic channel/RB is mapped to the MAC entity. For example:

```
Logical-and-transport-mappingList ::=   SEQUENCE   SIZE
(1..maxLogicalChannelNum)) OF Logical-and-transport-mapping
    Logical- and-transport-mapping ::=  SEQUENCE {
    logicalChannelIdentity      logicalChannelIdentity
    }
```

An RB identity (srb-Identity/drb-identity) may also be used to replace the logic channel identity to represent the mapping.

```
Logical-and-RB-mappingList ::=   SEQUENCE   SIZE
(1..maxRBNum)) OF Logical-and-RB-mapping
    Logical-and-RB-mapping ::=  SEQUENCE {
    RB-identity    RB-identity
    }
```

Particularly, deletion of a mapping information list may include only deleting a mapping identity (Channel-Mapping-identity).

(4) MAC-related Parameter

The MAC parameter included in the mapping may include all or a part of MAC layer configuration parameters, for example, a DRX mechanism parameter, an HARQ maximum retransmission times (maxHARQ-Tx), and an SPS configuration parameter.

Step 82: The base station sends a dedicated signaling to the UE, where the dedicated signaling includes the MAC layer configuration parameter and a corresponding processing manner.

The processing manner may be to add, delete, or re-configure one or multiple mapping parameters.

Step 83: The UE processes a corresponding mapping parameter according to the dedicated signaling.

According to an indication of the dedicated signaling, the mapping parameter may be added, deleted, or re-configured. A processed mapping parameter is the mapping parameter included in the dedicated signaling.

Step 84: The UE executes a MAC function according to each processed mapping parameter.

A MAC function executed by the MAC entity may include at least one of the following items:

(1) Uplink Transport Channel Mapping

The MAC entity maps an uplink logic channel to a corresponding uplink transport channel according to a mapping (Logical-and-transport-mappingList) between a transport channel and a logic channel/RB. For a manner of mapping the uplink logic channel to the uplink transport channel, reference may be made to FIG. 6.

(2) Downlink Transport Channel Mapping

The MAC entity maps a downlink logic channel to a corresponding downlink transport channel according to a mapping (Logical-and-transport-mappingList) between a transport channel and a logic channel/RB. For a manner of mapping the downlink logic channel to the downlink transport channel, reference may be made to FIG. 7.

(3) Uplink Physical Layer Channel Mapping

The MAC entity maps an uplink transport channel to an uplink physical layer channel of a corresponding cell/physical entity according to a mapping between a transport channel and a cell/PHY entity. Particularly, one MAC entity may be mapped to one or multiple cells/physical entities.

(4) Downlink Physical Layer Channel Mapping

The MAC entity maps a downlink transport channel to a downlink physical layer channel of a corresponding cell/physical entity according to a mapping between a transport channel and a cell/PHY entity. Particularly, one MAC entity may be mapped to one or multiple cells/physical entities.

(5) Uplink Scheduling Based on a Logic Channel Priority

In the prior art, all logic channels are mapped to a same transport channel/physical entity/cell, and therefore, during scheduling, priority sequencing and scheduling are performed on all the logic channels.

However, in this embodiment, logic channels are mapped to different transport channels/physical entities/cells, and therefore, for each transport channel/physical entity/cell, priority sequencing and scheduling are performed on a logic channel mapped to transport channel/physical entity/cell itself.

Specifically, for each transport channel/physical entity/cell, when executing new data transmission, the UE allocates, according to a priority of a logic channel mapped to the transport channel/physical entity/cell, an uplink transmission resource by adopting a token bucket algorithm. That is, the UE schedules, according to a sequence from high to low of logic channel priorities, data of a logic channel which is mapped to the transport channel/physical entity/cell and on which a currently allowed transmitted data amount (Bj)>0; and when Bj of all logic channels mapped to the transport channel/physical entity/cell <=0, but there is still a remaining uplink resource, the UE schedules, according to the sequence from high to low of the logic channel priorities, the data of the logic channel that is mapped to the transport channel/physical entity/cell.

In this embodiment, by configuring multiple sets of mappings for a UE, different logic channels can be mapped to different transport channels and/or physical layer channels according to the multiple sets of mappings, so as to satisfy a demand of a multi-flow transmission scenario, thereby improving MAC layer transmission efficiency.

Figure 9:
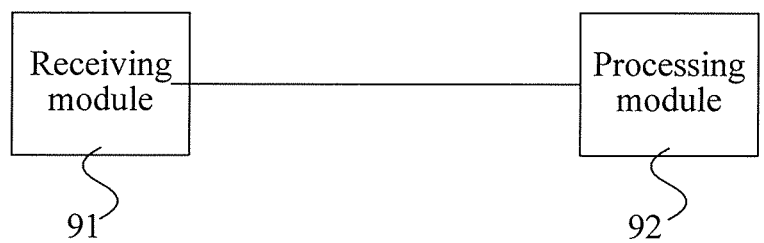
FIG. 9 is a simplified block diagram of a device for scheduling multi-flow transmission according to an embodiment of the present application.

FIG. 9 is a schematic structural diagram of a device for scheduling multi-flow transmission according to an embodiment of the present application. The device may be a terminal, for example, a UE or an MS, and the device includes a receiving module 91 and a processing module 92, where the receiving module 91 is configured to receive a MAC layer configuration parameter corresponding to a MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity; and the processing module 92 is configured to execute a MAC layer function according to the MAC layer configuration parameter, and perform MAC layer data transmission.

Optionally, the processing module is specifically configured to, when there is one MAC entity:

execute the first mapping and the second mapping between channels at least twice according to the MAC layer configuration parameter; or execute the first mapping between channels at least twice according to the MAC layer configuration parameter; or execute the second mapping between channels at least twice according to the MAC layer configuration parameter; or perform independent uplink scheduling according to the MAC layer configuration parameter.

Optionally, the processing module is specifically configured to perform the first mapping between the channels as follows:

when the first mapping is specifically a mapping between a logic channel identity and a transport channel identity, mapping an uplink logic channel to an uplink transport channel according to the mapping between the logic channel identity and the transport channel identity; or when the first mapping is specifically a mapping between an RB identity and a transport channel identity, mapping an uplink logic channel to an uplink transport channel according to the mapping between the RB identity and the transport channel identity and correspondence between the RB identity and a logic channel identity; or when the first mapping is specifically a mapping between a logic channel identity and a transport channel identity, mapping a downlink logic channel to a downlink transport channel according to the mapping between the logic channel identity and the transport channel identity; or when the first mapping is specifically a mapping between an RB identity and a transport channel identity, mapping a downlink logic channel to a downlink transport channel according to the mapping between the RB identity and the transport channel identity and correspondence between the RB identity and a logic channel identity; and perform the second mapping between the channels as follows:

when the second mapping is specifically a mapping between a transport channel identity and a physical entity identity, mapping, according to the mapping between the transport channel identity and the physical entity identity, an uplink transport channel to an uplink physical channel corresponding to a physical entity; or when the second mapping is specifically a mapping between a transport channel identity and a cell identity, mapping, according to the mapping between the transport channel identity and the cell identity, an uplink transport channel to an uplink physical channel corresponding to a cell; or when the second mapping is specifically a mapping between a transport channel identity and a physical entity identity, mapping, according to the mapping between the transport channel identity and the physical entity identity, a downlink transport channel to a downlink physical channel corresponding to a physical entity; or when the second mapping is specifically a mapping between a transport channel identity and a cell identity, mapping, according to the mapping between the transport channel identity and the cell identity, a downlink transport channel to a downlink physical channel corresponding to a cell.

Optionally, the processing module is specifically configured to, when there are at least two MAC entities:

execute the third mapping and/or the fourth mapping between channels according to the MAC layer configuration parameter, and perform independent uplink scheduling.

Optionally, the processing module is specifically configured to perform the third mapping between the channels as follows:

when the third mapping is specifically a mapping between a logic channel identity and a transport channel identity, mapping an uplink logic channel to an uplink transport channel according to the mapping between the logic channel identity and the transport channel identity; or when the third mapping is specifically a mapping between an RB identity and a transport channel identity, mapping an uplink logic channel to an uplink transport channel according to the mapping between the RB identity and the transport channel identity and correspondence between the RB identity and a logic channel identity; or when the third mapping is specifically a mapping between a logic channel identity and a MAC entity identity, mapping, according to the mapping between the logic channel identity and the MAC entity identity, an uplink logic channel to an uplink transport channel corresponding to a MAC entity; or when the third mapping is specifically a mapping between an RB identity and a MAC entity identity, mapping, according to the mapping between the RB identity and the MAC entity identity and correspondence between the RB identity and a logic channel identity, an uplink logic channel to an uplink transport channel corresponding to a MAC entity; or when the third mapping is specifically a mapping between a logic channel identity and a transport channel identity, mapping a downlink logic channel to a downlink transport channel according to the mapping between the logic channel identity and the transport channel identity; or when the third mapping is specifically a mapping between an RB identity and a transport channel identity, mapping a downlink logic channel to a downlink transport channel according to the mapping between the RB identity and the transport channel identity and correspondence between the RB identity and a logic channel identity; or when the third mapping is specifically a mapping between a logic channel identity and a MAC entity identity, mapping, according to the mapping between the logic channel identity and the MAC entity identity, a downlink logic channel to a downlink transport channel corresponding to a MAC entity; or when the third mapping is specifically a mapping between an RB identity and a MAC entity identity, mapping, according to the mapping between the RB identity and the MAC entity identity and correspondence between the RB identity and a logic channel identity, a downlink logic channel to a downlink transport channel corresponding to a MAC entity; and perform the fourth mapping between the channels as follows:

when the fourth mapping is specifically a mapping between a transport channel identity and a physical entity identity, mapping, according to the mapping between the transport channel identity and the physical entity identity, an uplink transport channel to an uplink physical channel corresponding to a physical entity; or when the fourth mapping is specifically a mapping between a transport channel identity and a cell identity, mapping, according to the mapping between the transport channel identity and the cell identity, an uplink transport channel to an uplink physical channel corresponding to a cell; or when the fourth mapping is specifically a mapping between a MAC entity identity and a physical entity identity, mapping, according to the mapping between the MAC entity identity and the physical entity identity, an uplink transport channel corresponding to a MAC entity to an uplink physical channel corresponding to a physical entity; or when the fourth mapping is specifically a mapping between a MAC entity identity and a cell identity, mapping, according to the mapping between the MAC entity identity and the cell identity, an uplink transport channel corresponding to a MAC entity to an uplink physical channel corresponding to a cell; or when the fourth mapping is specifically a mapping between a transport channel identity and a physical entity identity, mapping, according to the mapping between the transport channel identity and the physical entity identity, a downlink transport channel to a downlink physical channel corresponding to a physical entity; or when the fourth mapping is specifically a mapping between a transport channel identity and a cell identity, mapping, according to the mapping between the transport channel identity and the cell identity, an uplink transport channel to an uplink physical channel corresponding to a cell; or when the fourth mapping is specifically a mapping between a MAC entity identity and a physical entity identity, mapping, according to the mapping between the MAC entity identity and the physical entity identity, a downlink transport channel corresponding to a MAC entity to a downlink physical channel corresponding to a physical entity; or when the fourth mapping is specifically a mapping between a MAC entity identity and a cell identity, mapping, according to the mapping between the MAC entity identity and the cell identity, a downlink transport channel corresponding to a MAC entity to a downlink physical channel corresponding to a cell.

Optionally, the processing module is specifically configured to: when new data transmission is performed, schedule, according to the first mapping and the second mapping, uplink data of a logic channel that is mapped to a physical entity/cell corresponding to an uplink grant resource.

Optionally, the processing module is specifically configured to:

when new data transmission is performed, schedule, according to the third mapping and the fourth mapping, uplink data of a logic channel that is mapped to a physical entity/cell corresponding to an uplink grant resource.

Optionally, the processing module is further configured to:

when the MAC layer configuration parameter further includes a MAC layer-related parameter corresponding to each set of mapping, and there is one MAC entity, independently execute at least one MAC function of the following items: DRX, SPS, and HARQ according to the MAC layer-related parameter corresponding to each set of mapping and using each set of mapping as a unit; or when the MAC layer configuration parameter further includes a MAC layer-related parameter corresponding to each set of mapping, and there are at least two MAC entities, independently execute at least one MAC function of the following items: DRX, SPS, and HARQ according to the MAC layer-related parameter corresponding to each MAC entity and using each MAC entity as a unit, where the MAC layer configuration parameter further includes a MAC layer-related parameter corresponding to each set of mapping, and the MAC layer-related parameter includes at least one of the following items: a DRX configuration parameter, an SPS configuration parameter, and HARQ retransmission times.

Figure 10:
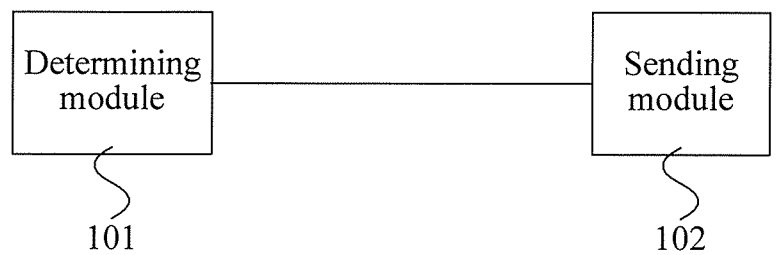
FIG. 10 is a simplified block diagram of a device for scheduling multi-flow transmission according to another embodiment of the present application.

FIG. 10 is a schematic structural diagram of a device for scheduling multi-flow transmission according to another embodiment of the present application. The device may be an LTE base station, an LTE access node, an RNC, an eNodeB, and a D2D terminal, and the device includes a determining module 101 and a sending module 102;

the determining module 101 is configured to determine a MAC layer configuration parameter corresponding to a MAC entity, where when there is one MAC entity, the MAC layer configuration parameter includes at least two sets of mappings, and the mapping includes a first mapping and/or a second mapping; or when there are at least two MAC entities, a MAC layer configuration parameter of each MAC entity includes a set of mapping, and the mapping includes a third mapping and/or a fourth mapping, where the first mapping is a mapping between a logic channel/radio bearer RB and a transport channel;

the second mapping is a mapping between a transport channel and a cell/physical entity;

the third mapping is a mapping between a logic channel/radio bearer RB and a transport channel/each MAC entity; and the fourth mapping is a mapping between a transport channel/each MAC entity and a cell/physical entity; and the sending module 102 is configured to send the MAC layer configuration parameter determined by the determining module to a terminal, so that the terminal executes a MAC layer function according to the MAC layer configuration parameter, and performs MAC layer data transmission.

Optionally, the determining module is specifically configured to, when there is one MAC entity, determine that the first mapping is specifically a mapping between a logic channel identity and a transport channel identity; or the first mapping is specifically a mapping between an RB identity and a transport channel identity; or the second mapping is specifically a mapping between a transport channel identity and a physical entity identity; or the second mapping is specifically a mapping between a transport channel identity and a cell identity; or the determining module is specifically configured to, when there are at least two MAC entities, determine that the third mapping is specifically a mapping between a logic channel identity and a transport channel identity; or the third mapping is specifically a mapping between an RB identity and a transport channel identity; or the third mapping is specifically a mapping between a logic channel identity and a MAC entity identity; or the third mapping is specifically a mapping between an RB identity and a MAC entity identity; or the fourth mapping is specifically a mapping between a transport channel identity and a physical entity identity; or the fourth mapping is specifically a mapping between a transport channel identity and a cell identity; or the fourth mapping is specifically a mapping between a MAC entity identity and a physical entity identity; or the fourth mapping is specifically a mapping between a MAC entity identity and a cell identity.

Optionally, the MAC layer configuration parameter obtained by the determining module further includes a MAC layer-related parameter corresponding to each set of mapping, and the MAC layer-related parameter includes at least one of the following items: a discontinuous reception DRX configuration parameter, a semi-persistent schedule SPS configuration parameter, and hybrid automatic repeat request HARQ retransmission times.

In this embodiment, by configuring at least two sets of mappings, different logic channels/RBs can be mapped to different transport channels/MAC entities and/or cells/physical entities according to different sets of mappings, so as to satisfy a demand of a multi-flow transmission scenario, thereby improving MAC layer transmission efficiency.

Persons of ordinary skill in the art may understand that all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program code, such as a ROM, a RAM, a magnetic disk, or an optical disc.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all of the technical features thereof; however, these modifications or replacements do not make the essence of corresponding technical solutions depart from the scope of the technical solutions in the embodiments of the present application.

What is claimed is:

1. A method comprising:
   receiving, from a base station by a terminal that corresponds to a first media access control (MAC) entity and a second MAC entity, a first MAC layer configuration parameter corresponding to the first MAC entity and a second MAC layer configuration parameter corresponding to the second MAC entity, wherein:
   the first MAC entity corresponds to a macro cell and the second MAC entity corresponds to a low power node (LPN) cell,
   the first MAC layer configuration parameter and the second MAC layer configuration parameter each comprise a set of mapping and a MAC-layer related parameter corresponding to the set of mapping,
   each set of mapping comprises a mapping between a logic channel and each MAC entity or between a radio bearer (RB) and each MAC entity, and
   each MAC layer-related parameter comprises at least one of the following items: a discontinuous reception (DRX) configuration parameter, a semi-persistent schedule (SPS) configuration parameter, and a maximum number of hybrid automatic repeat request (HARQ) retransmissions;
   executing, by the terminal, the mapping; and
   independently executing at least one MAC function of the following items: DRX, SPS, and HARQ according to the MAC layer-related parameter corresponding to each MAC entity.

2. The method according to claim 1, wherein executing, by the terminal, the mapping comprises:
   executing, by the terminal, the mapping according to at least one of the first and second MAC layer configuration parameters, and performing independent uplink scheduling.

3. The method according to claim 2, wherein executing the mapping comprises:
   when the mapping is a mapping between a logic channel identity and a MAC entity identity, mapping, according to the mapping between the logic channel identity and the MAC entity identity, an uplink logic channel to an uplink transport channel corresponding to a MAC entity.

4. The method according to claim 2, wherein executing the mapping comprises:
   when the mapping is a mapping between an RB identity and a MAC entity identity, mapping, according to the mapping between the RB identity and the MAC entity identity and correspondence between the RB identity and a logic channel identity, an uplink logic channel to an uplink transport channel corresponding to a MAC entity.

5. The method according to claim 2, wherein executing the mapping comprises:
   when the mapping is a mapping between a logic channel identity and a MAC entity identity, mapping, according to the mapping between the logic channel identity and the MAC entity identity, a downlink logic channel to a downlink transport channel corresponding to a MAC entity.

6. The method according to claim 2, wherein executing the mapping comprises:
   when the mapping is a mapping between an RB identity and a MAC entity identity, mapping, according to the mapping between the RB identity and the MAC entity identity and correspondence between the RB identity and a logic channel identity, a downlink logic channel to a downlink transport channel corresponding to a MAC entity.

7. The method according to claim 1, wherein each MAC layer-related parameter comprises the DRX configuration parameter, the SPS configuration parameter, and the maximum number of HARQ retransmissions.

8. A method comprising:
   determining, by a base station, a first media access control (MAC) layer configuration parameter corresponding to a first MAC entity and a second MAC layer configuration parameter corresponding to a second MAC entity, wherein:
   the first MAC entity corresponds to a macro cell and the second MAC entity corresponds to a low power node (LPN) cell,
   the first MAC layer configuration parameter and the second MAC layer configuration parameter each comprise a set of mapping and a MAC-layer related parameter corresponding to the set of mapping,
   each set of mapping comprises a mapping between a logic channel and each MAC entity or between a radio bearer (RB) and each MAC entity, and
   each MAC layer-related parameter comprises at least one of the following items: a discontinuous reception (DRX) configuration parameter, a semi-persistent schedule (SPS) configuration parameter, and a maximum number of hybrid automatic repeat request (HARQ) retransmissions; and
   sending, by the base station, the first and second MAC layer configuration parameters and the corresponding MAC layer-related parameters to a terminal, the first and second MAC layer configuration parameters and the corresponding MAC layer-related parameters enabling the terminal to (i) execute the mapping, and (ii) independently execute at least one MAC function of the following items: DRX, SPS, and HARQ according to the MAC layer-related parameter corresponding to each MAC entity.

9. A device comprising:
   a memory storing program instructions; and
   at least one processor coupled to the memory, wherein the program instructions, when executed by the at least one processor, cause the device to:
   receive, from a base station, a first media access control (MAC) layer configuration parameter corresponding to a first MAC entity and a second MAC layer configuration parameter corresponding to a second MAC entity, wherein:
  the first MAC entity corresponds to a macro cell and the second MAC entity corresponds to a low power node (LPN) cell,
  the first MAC layer configuration parameter and the second MAC layer configuration parameter each comprise a set of mapping and a MAC-layer related parameter corresponding to the set of mapping,
  each set of mapping comprises a mapping between a logic channel and each MAC entity or between a radio bearer (RB) and each MAC entity, and
  each MAC layer-related parameter comprises at least one of the following items: a discontinuous reception (DRX) configuration parameter, a semi-persistent schedule (SPS) configuration parameter, and a maximum number of hybrid automatic repeat request (HARQ) retransmissions; and
execute the mapping and independently execute at least one MAC function of the following items: DRX, SPS, and HARQ according to the MAC layer-related parameter corresponding to each MAC entity.

10. The device according to claim 9, wherein the program instructions, when executed by the at least one processor, further cause the device to execute the mapping according to at least one of the first and second MAC layer configuration parameters, and perform independent uplink scheduling.

11. The device according to claim 10, wherein the program instructions, when executed by the at least one processor, further cause the device to execute the mapping between the channels as follows:
  when the mapping is a mapping between a logic channel identity and a MAC entity identity, map, according to the mapping between the logic channel identity and the MAC entity identity, an uplink logic channel to an uplink transport channel corresponding to a MAC entity; or
  when the mapping is a mapping between an RB identity and a MAC entity identity, map, according to the mapping between the RB identity and the MAC entity identity and correspondence between the RB identity and a logic channel identity, an uplink logic channel to an uplink transport channel corresponding to a MAC entity; or
  when the mapping is a mapping between a logic channel identity and a MAC entity identity, map, according to the mapping between the logic channel identity and the MAC entity identity, a downlink logic channel to a downlink transport channel corresponding to a MAC entity; or
  when the mapping is a mapping between an RB identity and a MAC entity identity, map, according to the mapping between the RB identity and the MAC entity identity and correspondence between the RB identity and a logic channel identity, a downlink logic channel to a downlink transport channel corresponding to a MAC entity.

12. A device comprising:
a memory storing program instructions; and
at least one processor coupled to the memory, wherein the program instructions, when executed by the at least one processor, cause the device to:
determine a first media access control (MAC) layer configuration parameter corresponding to a first MAC entity and a second MAC layer configuration parameter corresponding to a second MAC entity, wherein:
  the first MAC entity corresponds to a macro cell and the second MAC entity corresponds to a low power node (LPN) cell,
  the first MAC layer configuration parameter and the second MAC layer configuration parameter each comprise a set of mapping and a MAC-layer related parameter corresponding to the set of mapping,
  each set of mapping comprises a mapping between a logic channel and each MAC entity or between a radio bearer (RB) and each MAC entity, and
  each MAC layer-related parameter comprises at least one of the following items: a discontinuous reception (DRX) configuration parameter, a semi-persistent schedule (SPS) configuration parameter, and a maximum number of hybrid automatic repeat request (HARQ) retransmissions; and
send the first and second MAC layer configuration parameters and the corresponding MAC layer-related parameters to a terminal, the first and second MAC layer configuration parameters and the corresponding MAC layer-related parameters enabling the terminal to (i) execute the mapping, and (ii) independently execute at least one MAC function of the following items: DRX, SPS, and HARQ according to the MAC layer-related parameter corresponding to each MAC entity.

* * * * *